United States Patent
Seo et al.

(10) Patent No.: US 11,411,415 B2
(45) Date of Patent: Aug. 9, 2022

(54) CHARGING APPARATUS FOR A CLEANER

(71) Applicant: LG Electronics Inc., Seoul (KR)

(72) Inventors: Jeongho Seo, Seoul (KR); Jaehong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 16/959,847

(22) PCT Filed: Jan. 2, 2019

(86) PCT No.: PCT/KR2019/000016
§ 371 (c)(1),
(2) Date: Jul. 2, 2020

(87) PCT Pub. No.: WO2019/135590
PCT Pub. Date: Jul. 11, 2019

(65) Prior Publication Data
US 2021/0367433 A1 Nov. 25, 2021

(30) Foreign Application Priority Data
Jan. 2, 2018 (KR) .................... 10-2018-0000380

(51) Int. Cl.
*H01M 10/46* (2006.01)
*H02J 7/00* (2006.01)
(Continued)

(52) U.S. Cl.
CPC .......... *H02J 7/0036* (2013.01); *A47L 9/2873* (2013.01); *B25J 9/1674* (2013.01); *H02J 7/0044* (2013.01); *A47L 2201/022* (2013.01)

(58) Field of Classification Search
CPC ...... H02J 7/0036; H02J 7/0044; H02J 7/0047; H02J 7/00034; A47L 2201/02; A47L 2201/022; A47L 9/2873
(Continued)

(56) References Cited

U.S. PATENT DOCUMENTS

2008/0211455 A1  9/2008  Park et al.
2012/0143428 A1  6/2012  Kim et al.
(Continued)

FOREIGN PATENT DOCUMENTS

KR  1020060034327  4/2006
KR   100792311 B  1/2008
(Continued)

*Primary Examiner* — Edward Tso
(74) *Attorney, Agent, or Firm* — Fish & Richardson P.C.

(57) ABSTRACT

A charging apparatus includes a main body including a charging electrode for charging a robot cleaner, a sensing unit for sensing that the robot cleaner is docked to the main body, and the robot cleaner is electrically connected to the charging electrode, a power supply unit for supplying charging current to the charging electrode, a measuring unit for measuring the magnitude of the charging current provided to the robot cleaner, and a MICOM for recognizing whether the robot cleaner is docked based on information on the magnitude of the charging current measured in the measuring unit. When the measured magnitude of the charging current is less than the magnitude of a set current, the MICOM transmits a first setting signal to the robot cleaner, and based on whether a second setting signal corresponding to the first setting signal is received, the MICOM checks whether the robot cleaner has been docked.

16 Claims, 4 Drawing Sheets

(51) Int. Cl.
*A47L 9/28* (2006.01)
*B25J 9/16* (2006.01)

(58) Field of Classification Search
USPC ........ 320/107, 114, 115, 132, 152, 157, 162
See application file for complete search history.

(56) References Cited

U.S. PATENT DOCUMENTS

2015/0288213 A1  10/2015  Lammeren et al.
2015/0375395 A1  12/2015  Kwon et al.

FOREIGN PATENT DOCUMENTS

| KR | 20150115668 | 10/2015 |
| KR | 20160123613 | 10/2016 |
| WO | WO2017209502 | 12/2017 |

CHARGING APPARATUS FOR A CLEANER

CROSS-REFERENCE TO RELATED APPLICATIONS

This application is a National Stage application under 35 U.S.C. § 371 of International Application No. PCT/KR2019/000016, filed on Jan. 2, 2019, which claims the benefit of Korean Patent Application No. 10-2018-0000380, filed on Jan. 2, 2018. The disclosures of the prior applications are incorporated by reference in their entirety.

TECHNICAL FIELD

The present disclosure relates to a charging apparatus (charging station) for charging a battery included in a robot cleaner.

BACKGROUND ART

In general, a cleaner is a home appliance for absorbing and removing a foreign substance from a floor surface.

Among such cleaners, a cleaner for cleaning while autonomously traveling in a predetermined range of a work area without manipulation of a user is referred to as a robot cleaner.

A robot cleaner determines a position of an obstacle or a wall through a sensor, a camera, or the like and performing a cleaning operation while traveling to avoid the obstacle or the wall using the determined information.

For the above traveling, the robot cleaner includes a battery for supplying power required for driving and the battery is reused through charging after power is consumed.

Thus, the robot cleaner is provided with a charging apparatus to a consumer and is docked to the charging apparatus to charge the battery.

The charging apparatus of the robot cleaner is disclosed in the following cited reference.

Korean Patent Publication No. 10-2012-0019437 (Mar. 6, 2012), Title of Invention: Charging Apparatus In the charging apparatus of the robot cleaner disclosed in the cited reference, when the robot cleaner is docked to the charging apparatus, charging is performed through contact between a charging electrode of the charging apparatus and a power electrode of the robot cleaner.

Conventionally, in order to recognize whether a charging apparatus of a robot cleaner is installed, information on the amplitude of charging current applied to a robot cleaner from a charging apparatus when a charging electrode and a power electrode contact each other is used.

As the robot cleaner is charged, the amplitude of the charging current is lowered. In this case, when the amplitude of the charging current deviates from a recognition range of a microcomputer, there is a problem in that the microcomputer of the charging apparatus recognizes the robot cleaner is separated from the charging apparatus and the battery of the robot cleaner is not sufficiently charged.

In order to overcome the problem, there is provided a method of configuring an amplifier for amplifying the amplitude of the charging current or a sensor for detecting installation of the robot cleaner on the charging apparatus.

When the charging apparatus includes the amplifier, error may be generated in information on charging current input to the microcomputer of the charging apparatus due to offset voltage applied to the amplifier.

In this case, in order to reduce the error, a resistance integer of a shunt resistor for measuring the amplitude of the charging current needs to be increased or an amplifier with excellent offset voltage performance needs to be used, and accordingly, there is a problem in that the design cost is increased.

In addition, when the charging apparatus includes a sensor (e.g., a switch sensor) for detecting installation of the robot cleaner, there is a problem in that design of the charging apparatus is complicated and the design cost is increased.

DISCLOSURE

Technical Problem

The present disclosure provides a charging apparatus for more accurately recognizing whether a robot cleaner is installed.

The present disclosure provides a charging apparatus for recognizing installation of a robot cleaner even if the amplitude of measured charging current is measured.

In addition, the present disclosure provides a charging apparatus for simplifying the design thereof by enhancing a control algorithm and more accurately recognizing installation of a robot cleaner.

Technical Solution

In an aspect of the present disclosure, a charging apparatus includes a main body on which a charging electrode for charging a robot cleaner is disposed, a detector configured to detect that the robot cleaner is docked to the main body and is electrically connected to the charging electrode, a power supply configured to supply charging current to the charging electrode, a measurer configured to measure amplitude of the charging current provided to the robot cleaner, and a microcomputer configured to recognize whether the robot cleaner is docked based on information on the amplitude of the charging current measured by the measurer.

When the amplitude of the measured charging current is less than amplitude of setting current, the microcomputer may transmit a first setting signal toward the robot cleaner, and check whether the robot cleaner is docked based on whether a second setting signal corresponding to the first setting signal is received.

The first setting signal may have a setting frequency, and the microcomputer may compare a frequency of the first setting signal with a frequency of the second setting signal and recognizes whether the robot cleaner is docked.

When the frequency of the first setting signal and the frequency of the second setting signal are matched with each other, the microcomputer may recognize that the robot cleaner is docked to the main body.

When the frequency of the first setting signal and the frequency of the second setting signal are matched with each other, the microcomputer may control the power supply to supply charging current to the charging electrode from the power supply.

When the frequency of the first setting signal and the frequency of the second setting signal are not matched with each other or the second setting signal is not received, the microcomputer may recognize that the robot cleaner is separated from the main body.

When recognizing that the robot cleaner is separated from the main body, the microcomputer may block supply of the charging current to the charging electrode from the power supply.

The first setting signal and the second setting signal may be a PWM signal.

The charging apparatus may further include a switch configured to electrically connect or disconnect the power supply and the charging electrode.

When the detector detects that the charging apparatus is docked, the microcomputer may turn on the switch and may electrically connect the power supply and the charging electrode.

The switch may include a transistor disposed between the power supply, the charging electrode, and the microcomputer.

The transistor may be turned on/off by the microcomputer and may electrically connect or disconnect the power supply and the charging electrode.

The transistor may include a first transistor disposed between the power supply and the charging electrode, and a second transistor disposed between the microcomputer and the first transistor and configured to turn on/off the first transistor.

In another aspect of the present disclosure, a method of controlling a charging apparatus includes detecting that an electrode of a robot cleaner is electrically connected to a charging electrode of the charging apparatus, when detecting that the electrode of the robot cleaner contacts the charging electrode of the charging apparatus, applying the charging current to the robot cleaner and performing charging, comparing amplitude of the charging current applied to the robot cleaner with amplitude of setting current, when the amplitude of the charging current is less than the amplitude of the setting current, transmitting a first setting signal toward the robot cleaner, and checking whether the robot cleaner is docked based on whether a second setting signal corresponding to the first setting signal is received.

The checking whether the robot cleaner is docked may include comparing a frequency of the first setting signal with a frequency of the second setting signal and recognizing whether the robot cleaner is docked, by the microcomputer.

When the frequency of the first setting signal and the frequency of the second setting signal are matched with each other, the microcomputer may recognize that the robot cleaner is docked to the charging apparatus.

When the frequency of the first setting signal and the frequency of the second setting signal are not matched with each other or the second setting signal is not received, the microcomputer may recognize that the robot cleaner is separated from the charging apparatus.

When recognizing that the robot cleaner is docked to the charging apparatus, the microcomputer may control the power supply to supply charging current to the charging electrode.

When recognizing that the robot cleaner is docked to the charging apparatus, the microcomputer may control the power supply to supply charging current to the charging electrode.

Advantageous Effects

According to the present disclosure, in a procedure in which a charging apparatus charges a robot cleaner, even if charging current is reduced, a microcomputer of the charging apparatus may transmit a first setting signal toward the robot cleaner, and may recognize whether the charging apparatus of the robot cleaner is installed based on whether a second setting signal corresponding to the transmitted signal is received.

Thus, even if the amplitude of charging current, from which charging of a battery of the robot cleaner is measured, is reduced and a recognition rate is lowered, whether the robot is installed may be more accurately recognized using transmission and reception of a signal.

In particular, irrespective of information on the amplitude of the charging current, whether transmitted frequencies are matched with each other may be compared and whether the robot cleaner is installed on the charging apparatus may be checked, and thus advantageously, it is not required to consider an error rate of an amplifier due to the amplitude of the charging current. Accordingly, whether the robot cleaner is installed on the charging apparatus may be more accurately recognized.

Without necessity of a separate sensor for detecting installation of a robot cleaner, a recognition rate of the robot cleaner with respect to the apparatus may be enhanced simply by enhancing a control algorithm, thereby advantageously reducing the design cost.

BEST MODE

Hereinafter, at least one embodiment of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. It will be understood that when one element is referred to as being "connected to", "coupled to", or "access" another element, one element may be "connected to", "coupled to", or "access" another element via a further element although one element may be directly connected to or directly access another element.

[Configuration of Robot Cleaner and Charging Apparatus]

Figure 1:
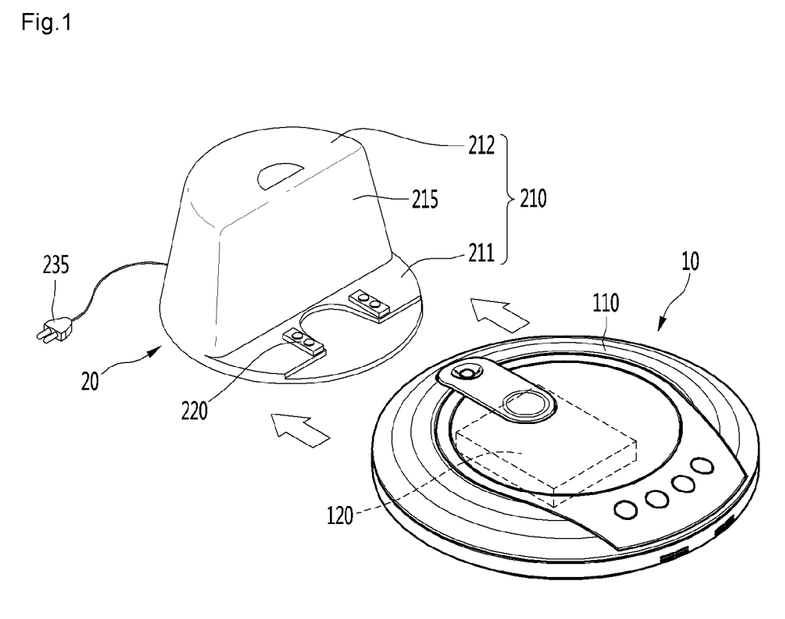
FIG. 1 is a perspective view showing a robot cleaner and a charging apparatus according to an embodiment of the present disclosure.

FIG. 1 is a perspective view showing a robot cleaner and a charging apparatus according to an embodiment of the present disclosure.

Referring to FIG. 1, a charging apparatus 20 according to an embodiment of the present disclosure may supply power to a battery 120 installed in a main body 110 of a robot cleaner 10 and may charge a battery 120.

According to the present embodiment, the case in which the robot cleaner 10 is docked to the charging apparatus 20 is described. However, according to another embodiment, it may also be possible to install the robot cleaner 10 on the charging apparatus 20 in the state in which the battery 120 is separated from the robot cleaner 10.

The charging apparatus 20 may include a charging apparatus main body 210 forming an outer appearance, a charging electrode 220 for supplying power to the robot cleaner 10, and a power cord 235 for receiving commercial power.

The charging apparatus main body 210 may include a first body 211 that is supported on a floor surface and installs the robot cleaner 10 thereon, and a second body 212 that extends from the first body 211.

The second body 212 may extend in an upward direction of the first body 211.

The charging apparatus main body 210 may have an approximate '⌊' shape.

The first body 211 may be configured in a plate form in order to be stably supported on a floor surface. For example, as shown in the drawing, a bottom surface of the first body 211 may contact the floor surface. The robot cleaner 10 may be accommodated (or docked) onto a top surface of the first body 211.

The charging electrode 220 for supplying power to the battery 120 of the robot cleaner 10 may be disposed on the top surface of the first body 211. Charging current for charging the battery 120 may be supplied to the charging electrode 220. The charging current may be formed by a power supply 240 (FIG. 2) included in the second body 212. The power supply 240 will be described in more detail.

The second body 212 may include a charging device for detecting accommodation (or docking) of the robot cleaner 10 onto the first body 211, checking the state of the battery 120 of the robot cleaner 10, and charging the battery 120. When detecting accommodation (or docking) of the robot cleaner 10 onto the first body 211, the charging device may charge the battery 120 based on a battery state.

Hereinafter, the configuration of the charging apparatus will be described in more detail.

[Configuration of Charging Apparatus for Charging Battery of Robot Cleaner]

Figure 2:
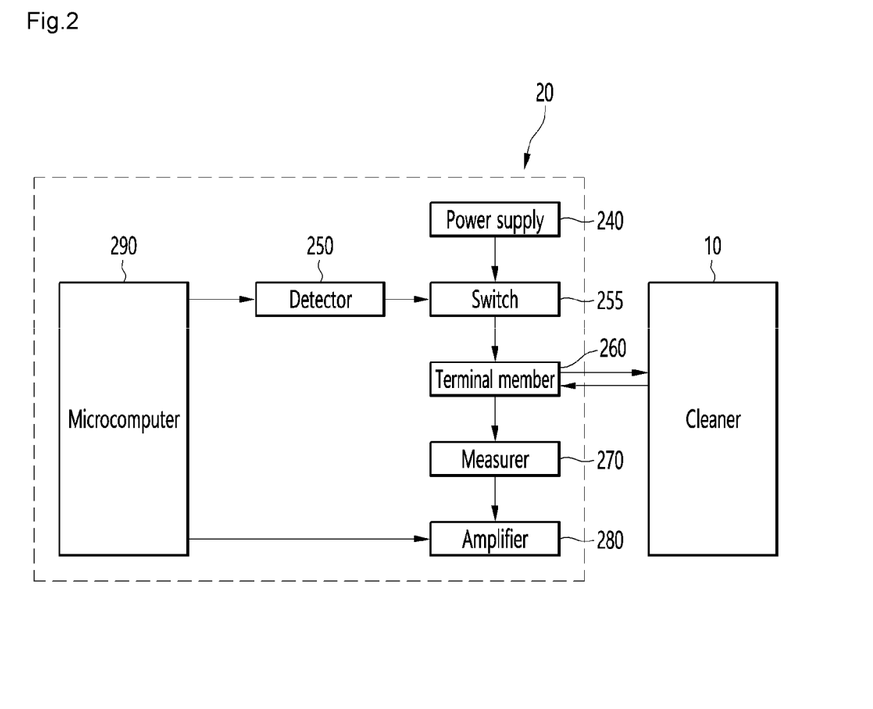
FIG. 2 is a block diagram showing a circuit configuration of a charging apparatus according to an embodiment of the present disclosure.
Figure 3:
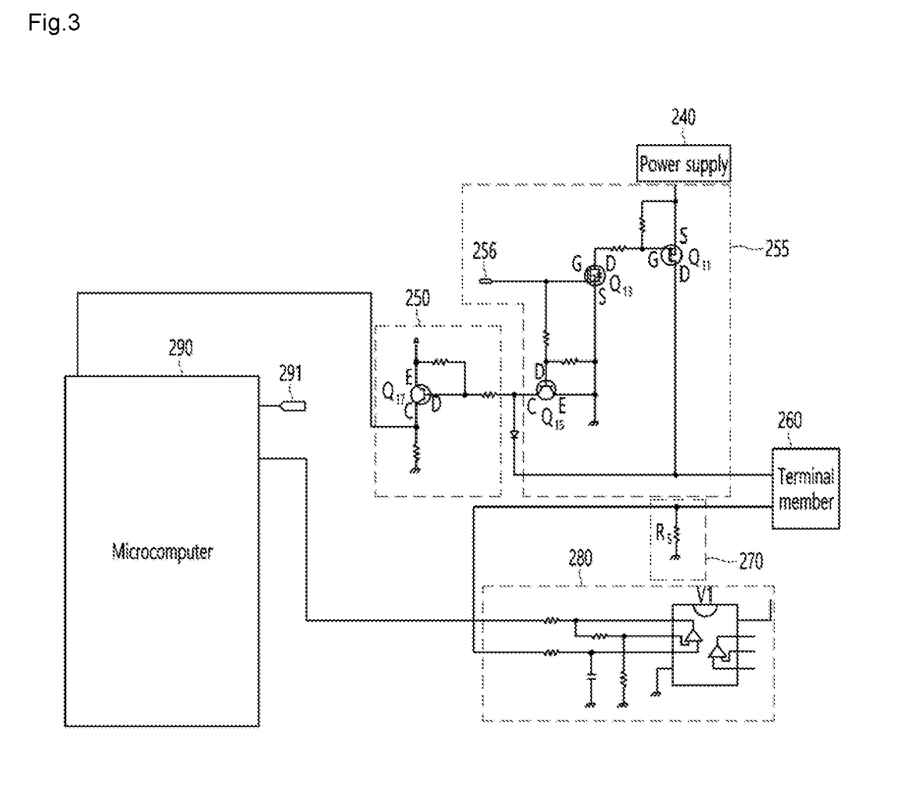
FIG. 3 is a circuit diagram of a charging apparatus according to an embodiment of the present disclosure.

FIG. 2 is a block diagram showing a control configuration of a charging apparatus according to an embodiment of the present disclosure. FIG. 3 is a circuit diagram of a charging apparatus according to an embodiment of the present disclosure.

Referring to FIGS. 2 and 3, the charging apparatus 20 may include the power supply 240 for supplying charging power to the battery 120 of the robot cleaner 10. The power supply 240 may convert commercial power to charging power appropriate to be supplied to the battery 120 of the robot cleaner 10.

The charging apparatus 20 may further include a detector 250 for detecting accommodation (or docking) of the robot cleaner 10. When detecting accommodation of the robot cleaner 10, the detector 250 may transfer a detection signal to a microcomputer 290 that will be described below.

When recognizing the detection signal, the microcomputer 290 may electrically connect the charging electrode 220 of the charging apparatus 20 to the power electrode of the robot cleaner 10. Accordingly, the charging power of the power supply 240 may be transferred toward the battery 120 of the robot cleaner 10.

The detector 250 may include a switch. The switch may include a plurality of transistors $Q_{11}$, $Q_{13}$, $Q_{15}$, and $Q_{17}$. The plurality of transistors may include a first transistor $Q_{11}$ disposed between the power supply 240 and a terminal member 260 that will be described below.

The plurality of transistors may further include a second transistor $Q_{13}$ disposed between the microcomputer 290 and the first transistor.

The second transistor $Q_{13}$ may be turned on/off by the microcomputer 290. In detail, a gate electrode G of the second transistor $Q_{13}$ may be connected to a first signal terminal 256. The first signal terminal 256 may be connected to a second signal terminal 291 connected to the microcomputer 290.

When turning on the second transistor $Q_{13}$ through the first and second signal terminals 256 and 291, the microcomputer 290 may turn on the first transistor $Q_{11}$. Accordingly, the power supply 240 and the terminal member 260 may be electrically connected to each other. Thus, charging power of the power supply 240 may be supplied to the battery 120 of the robot cleaner 10 through the terminal member 260.

The plurality of transistors may include a third transistor $Q_{15}$ disposed between the microcomputer 290 and the terminal member 260.

A drain terminal D of the third transistor $Q_{15}$ may be connected to the first signal terminal 256. When the microcomputer 290 transmits a signal having a setting frequency, a switching signal corresponding to the setting signal may be transferred toward the terminal member 260 through the third transistor $Q_{15}$. The switching signal may have the same frequency as the setting signal.

The plurality of transistors may further include a fourth transistor $Q_{17}$ disposed between the microcomputer 290, the terminal member 260, and the power supply 240.

An emitter terminal E of the fourth transistor $Q_{17}$ may be connected to the power supply 240. The power supply 240 may convert commercial power into driving power for an operation of the transistor $Q_{17}$ and may provide the driving power to the emitter terminal E of the transistor $Q_{17}$.

A collector terminal C of the fourth transistor $Q_{17}$ may be connected to each of the microcomputer 290 and a ground line. A drain terminal D of the fourth transistor $Q_{17}$ may be connected to the terminal member 260.

When the power cord 235 is connected to a socket, the driving power may be supplied to the emitter terminal E of the fourth transistor $Q_{17}$.

When the robot cleaner 10 is accommodated on the first body 211, the drain terminal D of the fourth transistor $Q_{17}$ may be connected to a side of the robot cleaner 10 to form a closed circuit.

For example, the drain terminal D of the fourth transistor $Q_{17}$ may be connected to a ground of a side of the robot cleaner 10. In this case, the fourth transistor $Q_{17}$ may be turned on. In this case, the driving power may be input, as an accommodation signal (a docking signal) indicating that the robot cleaner 10 is recognized to be accommodated on the charging apparatus 20, to the microcomputer 290.

The charging apparatus 20 may include the terminal member 260 that is electrically connected to the charging electrode 220. The terminal member 260 may be connected to the charging electrode 220.

The terminal member 260 may be electrically connected to the power supply 240 and the detector 250. Accordingly, a contact signal of the charging electrode 220 and the power electrode may be input to the detector 250 through the terminal member 260.

The charging apparatus 20 may further include a measurer 270 that is electrically connected to the terminal member 260 and measures charging current supplied toward the robot cleaner 10. For example, the measurer 270 may include a shunt resistor.

The charging apparatus 20 may further include an amplifier 280 for amplifying a signal containing information on the amplitude of charging current measured by the terminal member 260.

As the battery 120 is charged by the charging apparatus 20, the amplitude of the charging current of the battery 120 may be gradually reduced. In this case, the amplifier 280 amplifies the signal containing the information on the amplitude of the charging current, and thus, even if the amplitude of the charging current is reduced, the microcomputer 290 may be capable of recognizing a state of charge (SoC) of the battery 120.

The charging apparatus 20 may further include the microcomputer 290 for recognizing a detection signal of the detector 250 and determining whether charging power is supplied to the battery 120 of the robot cleaner 10.

When recognizing the detection signal, the microcomputer 290 may be electrically connected to the power supply 240 and the terminal member 260.

The microcomputer 290 may recognize the amplitude of the charging current supplied to the battery 120 of the robot cleaner 10 installed on the charging apparatus 20 through the measurer 270 and the amplifier 280.

When the amplitude of the charging current becomes less than a preset setting value, the microcomputer 290 may transmit a setting signal having a setting frequency toward the detector 250.

The setting signal may have the setting frequency. For example, the setting signal may include a PWM signal having a preset frequency. The setting frequency may be set by a user.

The setting signal may be input to the detector 250. The detector 250 may transfer a signal (hereinafter, a switching signal) having the same frequency as the setting signal toward the robot cleaner 10 through the terminal member 260. The signal having the setting frequency may be returned by a side of the robot cleaner 10 and may be input back to the terminal member 260.

The signal input to the terminal member 260 may be input to the microcomputer 290 through the amplifier 280. In this case, the microcomputer 290 may check whether frequencies of the transmitted setting signal and a received signal are matched with each other and may check whether the charging apparatus 20 of the robot cleaner 10 is accommodated.

When the frequencies of the transmitted setting signal and the received signal are matched with each other, the microcomputer 290 may recognize that the robot cleaner 10 is accommodated on the charging apparatus 20. That is, the microcomputer 290 may recognize that the power electrode of the robot cleaner 10 and the charging electrode 220 of the charging apparatus 20 contact each other.

In this case, the power supply 240 and the terminal member 260 may be maintained to be electrically connected to each other, thereby maintaining a charging state of the battery 120. Accordingly, charging efficiency of the battery 120 may be advantageously enhanced.

On the other hand, when the transmitted setting signal and the received signal are not matched with each other, the microcomputer 290 may recognize that the robot cleaner 10 is separated from the charging apparatus 20. In this case, electrical connection between the power supply 240 and the terminal member 260 may be blocked, thereby preventing power from being unnecessarily consumed.

<Circuit Operation of Charging Apparatus>

Figure 4:
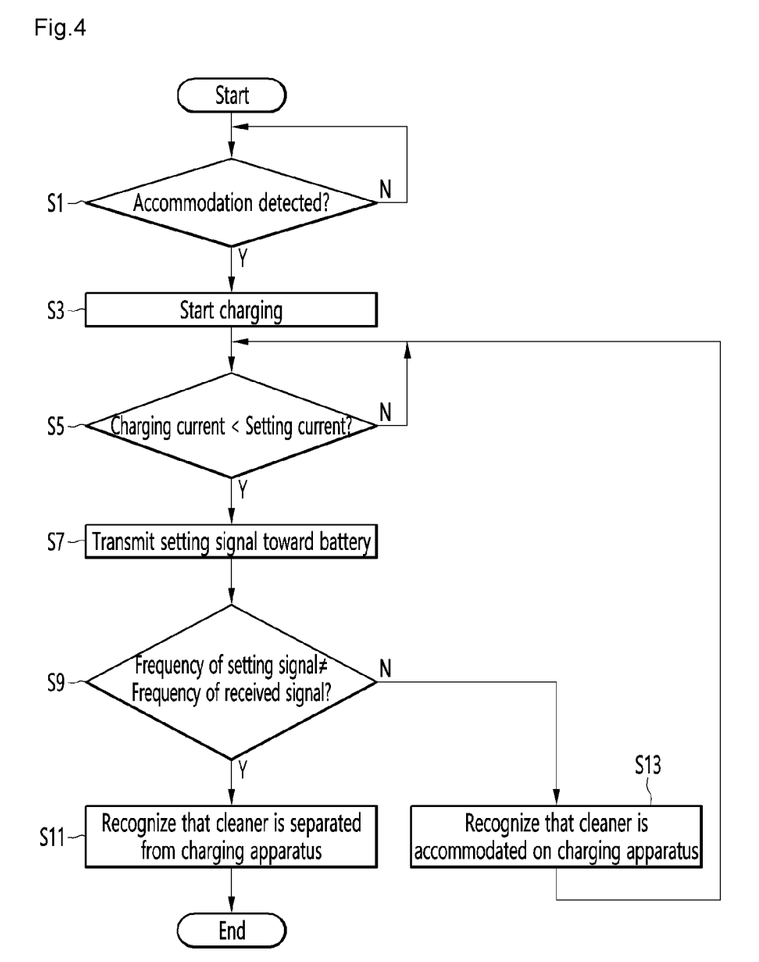
FIG. 4 is a flowchart showing a control algorithm of a charging apparatus according to an embodiment of the present disclosure.

FIG. 4 is a flowchart showing a control algorithm of a charging apparatus according to an embodiment of the present disclosure.

Referring to FIGS. 3 and 4, when the robot cleaner 10 is accommodated on the first body 211 of the charging apparatus 20, the microcomputer 290 may recognize an accommodation signal (S1). In detail, when the robot cleaner 10 is accommodated on the first body 211, the power terminal of the robot cleaner 10 and the charging electrode 220 of the charging apparatus 20 may contact each other.

In this case, as the fourth transistor $Q_{17}$ of the detector 250 is turned on, a detection signal may be input to the microcomputer 290.

When recognizing the detection signal, the microcomputer 290 may transmit a setting signal having a setting frequency toward the terminal member 260. The microcomputer 290 may transmit the setting signal toward the terminal member 260 through the third transistor $Q_{15}$. When a signal having the setting frequency is input to the microcomputer 290 within a setting time, the microcomputer 290 may recognize that the robot cleaner 10 is accommodated on the charging apparatus 20.

The microcomputer 290 may supply charging power to the battery 120 of the robot cleaner 10 through the terminal member 260 (S3). That is, a battery of the robot cleaner 10 may be charged.

In detail, the microcomputer 290 may turn on the second transistor $Q_{13}$ and the first transistor $Q_{11}$. Thus, charging current of the power supply 240 may be supplied to the battery of the robot cleaner 10 through the terminal member 260. The microcomputer 290 may measure the amplitude of the charging current supplied to the battery 120 of the robot cleaner 10 using the measurer 270 and the amplifier 280. As the battery 120 of the robot cleaner 10 is charged, the amplitude of the charging current supplied to the battery 120 may be gradually reduced.

The microcomputer 290 may check whether the amplitude of the charging current is less than the amplitude of setting current through the measurer 270 and the amplifier 280 (S5).

The setting current may be understood as being a value when error of a value amplified by the amplifier 280 is equal to or greater than a reference value.

When the amplitude of the charging current is less than the amplitude of the setting current, the microcomputer 290 may transmit the setting signal toward the robot cleaner 10.

The microcomputer 290 may generate the setting signal having the setting frequency to the first and second signal terminals 256 and 291. Thus, the switching signal having the setting frequency may be transferred toward the robot cleaner 10 through the third transistor $Q_{15}$.

The microcomputer 290 may check whether the same signal having the setting frequency of the setting signal is received within a setting time (S9).

The microcomputer 290 may check whether a signal having the same frequency as the setting frequency is input through the measurer 270 and the amplifier 280.

When the received signal having the setting frequency is not recognized within the setting time, the microcomputer 290 may recognize that the robot cleaner 10 is not accommodated on the first body 211, that is, as a separated state.

Thus, the first and second transistors $Q_{11}$ and $Q_{13}$ may be turned off, and thus, power of the power supply 240 may be prevented from being supplied toward the terminal member 260, thereby enhancing consumption power efficiency and preventing safety hazard when the charging electrode 220 connected to the terminal member 260 contacts a body of a user.

In operation S9, when recognizing the received signal having the setting frequency within the setting time, the first microcomputer 290 may recognize the robot cleaner 10 is accommodated on the first body 211 (S13).

Thus, the microcomputer 290 may turn on the first and second transistors $Q_{11}$ and $Q_{13}$ to continuously charge the battery 120 of the robot cleaner 10.

Thus, the battery 120 of the robot cleaner 10 may be sufficiently charged, and thus, the efficiency of the battery may be advantageously enhanced.

In addition, irrespective of information on the amplitude of the charging current measured by the measurer 270, whether the charging apparatus 20 of the robot cleaner 10 is accommodated may be checked only based on whether a signal having the setting frequency is received, and thus advantageously, it is not required to consider an error rate of the amplifier 280 due to the amplitude of the charging current.

In other words, whether the charging apparatus 20 of the robot cleaner 10 is accommodated may be more accurately recognized. Without necessity of a separate sensor (e.g., a switch), the microcomputer 290 may advantageously recognize whether the robot cleaner 10 is accommodated.

Hereinafter, another embodiment is proposed.

In the previous embodiment, when the detector 250 recognizes an accommodation signal, the microcomputer 290 may transmit a setting signal having a setting frequency toward the robot cleaner 10, may compare whether a frequency of a signal received within a setting time and the setting frequency are matched with each other, and may recognize whether the robot cleaner 10 is accommodated on the charging apparatus 20.

According to another embodiment, when recognizing the accommodation signal, the microcomputer 290 may provide charging power toward the robot cleaner 10 through the terminal member 260, may check the amplitude of the charging current measured by the measurer 270, and may also recognize whether the robot cleaner 10 is accommodated on the charging apparatus 20.

In the specification, a signal that is transmitted toward the robot cleaner 10 in order to enable the microcomputer 290 to check whether the robot cleaner 10 is accommodated may be referred to as a first setting signal.

In addition, a signal that corresponds to the first setting signal and is returned by a side of the robot cleaner 10 and received by the microcomputer 290 of the charging apparatus 20 may be referred to as a second setting signal.

What is claimed is:

1. A charging apparatus comprising:
a main body on which a charging electrode for charging a robot cleaner is disposed;
a detector configured to detect that the robot cleaner is docked to the main body and is electrically connected to the charging electrode;
a power supply configured to supply charging current to the charging electrode;
a measurer configured to measure an amplitude of the charging current provided to the robot cleaner; and
a microcomputer configured to recognize whether the robot cleaner is docked based on information on the amplitude of the charging current measured by the measurer,
wherein, when the amplitude of the measured charging current is less than an amplitude of setting current, the microcomputer transmits a first setting signal toward the robot cleaner, and checks whether the robot cleaner is docked based on whether a second setting signal corresponding to the first setting signal is received.

2. The charging apparatus of claim 1, wherein the first setting signal has a setting frequency; and
wherein the microcomputer compares a frequency of the first setting signal with a frequency of the second setting signal and recognizes whether the robot cleaner is docked.

3. The charging apparatus of claim 2, wherein, when the frequency of the first setting signal and the frequency of the second setting signal are matched with each other, the microcomputer recognizes that the robot cleaner is docked to the main body.

4. The charging apparatus of claim 2, wherein, when the frequency of the first setting signal and the frequency of the second setting signal are not matched with each other or the second setting signal is not received, the microcomputer recognizes that the robot cleaner is separated from the main body.

5. The charging apparatus of claim 2, wherein the first setting signal and the second setting signal are a PWM signal.

6. The charging apparatus of claim 3, wherein, when the frequency of the first setting signal and the frequency of the second setting signal are matched with each other, the microcomputer controls the power supply to supply the charging current to the charging electrode.

7. The charging apparatus of claim 4, wherein, when recognizing that the robot cleaner is separated from the main body, the microcomputer blocks supply of the charging current to the charging electrode from the power supply.

8. The charging apparatus of claim 1, further comprising:
a switch configured to electrically connect or disconnect the power supply and the charging electrode,
wherein, when the detector detects that the charging apparatus is docked, the microcomputer turns on the switch and electrically connects the power supply and the charging electrode.

9. The charging apparatus of claim 8, wherein the switch includes a transistor disposed between the power supply, the charging electrode, and the microcomputer; and
wherein the transistor is turned on or off by the microcomputer and electrically connects or disconnects the power supply and the charging electrode.

10. The charging apparatus of claim 9, wherein the transistor includes:
a first transistor disposed between the power supply and the charging electrode; and
a second transistor disposed between the microcomputer and the first transistor and configured to turn on or off the first transistor.

11. A method of controlling a charging apparatus, the method comprising:
detecting that an electrode of a robot cleaner is electrically connected to a charging electrode of the charging apparatus;
when detecting that the electrode of the robot cleaner contacts the charging electrode of the charging apparatus, applying charging current to the robot cleaner and performing charging;
comparing an amplitude of the charging current applied to the robot cleaner with an amplitude of setting current;
when the amplitude of the charging current is less than the amplitude of the setting current, transmitting a first setting signal toward the robot cleaner; and checking whether the robot cleaner is docked based on whether a second setting signal corresponding to the first setting signal is received.

12. The method of claim 11, wherein the checking whether the robot cleaner is docked includes comparing a frequency of the first setting signal with a frequency of the second setting signal and recognizing whether the robot cleaner is docked, by a microcomputer.

13. The method of claim 12, wherein, when the frequency of the first setting signal and the frequency of the second setting signal are matched with each other, the microcomputer recognizes that the robot cleaner is docked to the charging apparatus.

14. The method of claim 12, wherein, when the frequency of the first setting signal and the frequency of the second setting signal are not matched with each other or the second setting signal is not received, the microcomputer recognizes that the robot cleaner is separated from the charging apparatus.

15. The method of claim 13, wherein, when recognizing that the robot cleaner is docked to the charging apparatus, the microcomputer controls a power supply to supply charging current to the charging electrode.

16. The method of claim 14, wherein, when recognizing that the robot cleaner is separated from the charging apparatus, the microcomputer blocks supply of the charging current to the charging electrode from a power supply.

* * * * *